2,795,612

POLY[3 - (LOWER - ALKYLCYCLOHEXYL)PROPYL] AMINES, SALTS THEREOF, AND PREPARATION THEREOF

Froilan P. Luduena, Albany, N. Y., assignor to Sterling Drug Inc., New York, N. Y., a corporation of Delaware No Drawing. Application June 9, 1954,
Serial No. 435,614

13 Claims. (Cl. 260—563)

This invention relates to poly[3-(lower-alkylcyclohexyl)propyl]amines and their acid-addition salts and, more particularly, to such amines prepared for use as coronary dilators. Thus, the subject matter of the invention relates to a new series of ring-alkyl substituted cycloalkylpropylamines, and to a process for the preparation thereof. The new compounds have the formula

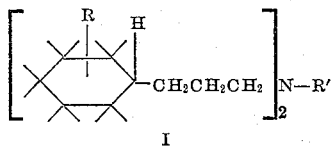

wherein R is a lower-alkyl group and R' is selected from the group consisting of hydrogen, lower-alkyl and 3-(lower-alkylcyclohexyl)propyl radicals.

In the above formula the group R represents a lower-alkyl group. The lower-alkyl group can be in any one of the 2-, 3- and 4-positions with respect to the propyl side chain, and contains from one to about four carbon atoms, thus including methyl, ethyl, propyl, isopropyl, butyl, isobutyl, and the like.

In the above formula the group R' represents hydrogen, a lower-alkyl radical, or a 3-(lower-alkylcyclohexyl)-propyl radical. When R' is a lower-alkyl radical, it contains from one to about eight carbon atoms and can be straight or branched, thus including such groups as methyl, ethyl, propyl, isopropyl, butyl, pentyl, hexyl, heptyl, octyl, isohexyl, isooctyl, and the like. When R' is a 3-(lower-alkylcyclohexyl)propyl radical, it is preferably, although not necessarily, identical with the other 3-(lower-alkylcyclohexyl)propyl groups in the molecule.

The compounds of the invention are prepared by the reaction of two or more equivalents of a 3-(lower-alkyl-cyclohexyl)propyl halide, $RC_6H_{10}CH_2CH_2CH_2X$, where X is halogen selected from chlorine, bromine and iodine, preferably bromine, with ammonia or a primary amine $H_2NR'$. The reaction is carried out by heating the reactants in an inert solvent in the presence of an acid acceptor such as sodium carbonate, designed to take up the hydrogen halide formed. In the reaction with ammonia there is produced first the primary amine $RC_6H_{10}CH_2CH_2CH_2NH_2$, then the secondary amine, $(RC_6H_{10}CH_2CH_2CH_2)_2NH$, and finally the tertiary amine, $(RC_6H_{10}CH_2CH_2CH_2)_3N$. In the reaction with the primary amine $H_2NR'$ the first substance produced in the reaction mixture is the secondary amine, $$RC_6H_{10}CH_2CH_2CH_2NHR'$$

which then reacts further with another mole of cyclohexylpropyl halide to give the tertiary amine, $$(RC_6H_{10}CH_2CH_2CH_2)_2NR'$$

Frequently the reaction mixture will be found to contain a mixture of the secondary and tertiary amines, the relative amounts of each depending upon the conditions of time and temperature used during the reaction. Higher temperature and longer times favor the formation of the tertiary amine. The secondary and tertiary amines can be separated by fractional distillation, or by fractional crystallization or selective extraction of their acid-addition salts.

Alternatively, the secondary amine,

can be prepared by hydrogenolysis of the benzyl substituted tertiary amine,

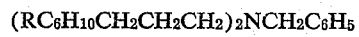

in turn prepared by alkylation of benzylamine with $RC_6H_{10}CH_2CH_2CH_2Br$. A tertiary amine of formula I can then be prepared by condensation of the secondary amine, $(RC_6H_{10}CH_2CH_2CH_2)_2NH$ with any desired alkyl halide R'X.

In compounds where R is lower-alkyl a number of isomeric substances is possible. The lower-alkyl group may be in the 2-, 3- or 4-position and in the position cis or trans with respect to the propyl side chain. Mixtures of these isomers are often encountered during the course of synthesis. It is not necessary to separate these isomers in order to obtain useful and active products, but the separation may be carried out if desired and as illustrated in the examples below.

My new compounds are useful either in the free base form or in the form of non-toxic acid-addition salts and these salts are within the purview of the invention. The acids which can be used to prepare acid-addition salts are preferably those which produce when combined with the free base, salts whose anions are relatively innocuous to the animal organism in therapeutic doses of the salts, so that the beneficial physiological properties inherent in the free base are not vitiated by side effects ascribable to the anions. Appropriate acid-addition salts are those derived from mineral acids such as hydrochloric acid, hydrobromic acid, hydriodic acid, nitric acid, phosphoric acid and sulfuric acid; and organic acids such as acetic acid, citric acid, tartaric acid, lactic acid, and the like, giving the hydrochloride, hydrobromide, hydriodide, nitrate, phosphate or acid phosphate, sulfate or bisulfate, acetate, citrate or acid citrate, tartrate or bitartrate, and lactate salts, respectively.

The compounds of my invention are useful as coronary dilators. When introduced into the mammalian organism by the intravenous route, the compounds dilate the coronary arteries and arterioles, increasing the heart blood flow. The compounds are therefore valuable in the treatment of myocardial ischemia due to organic or functional decrease in the caliber of the coronary vessels.

The new compounds are readily evaluated by measuring their effect upon the isolated perfused rabbit heart (Langendorff's method), in which the coronary vessels are constricted by the action of beta-hypophamine or naphazoline. A very dilute aqueous solution of known concentration is prepared from a sample of one of the compounds either in the free base form or as an acid-addition salt. The solution is then injected into the perfusion system and is thus perfused through the rabbit heart previously constricted by a given amount of beta-hypophamine added to the perfusion fluid, and the decrease in pressure necessary to maintain a constant rate of flow is measured. The dose of papaverine, a standard drug for the purpose, necessary to produce the same drop in pressure is also measured. The ratio of the concentration of papaverine to that of the new compound is a measure of the efficacy of the latter.

The following examples will further illustrate the invention.

*Example 1*

(a) *Methylcinnamic acid.*—A mixture of 228.8 g. of malonic acid, 160 cc. of dry pyridine, 240 g. of m-tolualdehyde (containing some o- and p-tolualdehyde) and 2.0 cc. of dry piperidine was heated to 60° C. and then gradually heated further over a period of three hours at 105° C. After another hour at 105° C. the reaction mixture was cooled, about one liter of benzene was added followed by 250 cc. of concentrated hydrochloric acid in 250 cc. of water. The mixture was shaken and the layers were separated. The benzene layer was washed with water, with sodium carbonate solution and again with water. Concentrated hydrochloric acid was added to the sodium carbonate extracts to the point of incipient precipitation, but maintaining the solution still on the alkaline side. The solution was heated nearly to boiling, decolorized with activated charcoal and filtered. The filtrate was then acidified to Congo red with concentrated hydrochloric acid and the precipitated material was collected by filtration, giving 259.7 g. of 3-methylcinnamic acid (containing some 2- and 4-methylcinnamic acid). The methylcinnamic acid was further purified by recrystallization from dilute ethanol, obtaining a product with the M. P. 93–98° C.

(b) β-(Methylcyclohexyl)propionic acid.—A solution of 48.6 g. of 3-methylcinnamic acid, M. P. 93–98° C., containing some 2-methyl and 4-methylcinnamic acid, in 750 cc. of glacial acetic acid was hydrogenated in the presence of 1.2 g. of platinum oxide catalyst at an initial pressure of 515 lbs. per sq. inch. After five and one-half hours the theoretical quantity of hydrogen had been taken up, the catalyst was removed by filtration, the filtrate concentrated in vacuo and the residue distilled. The fraction boiling at 105–106° C. (0.08–0.11 mm.) was collected, giving 48.7 g. of β-(methylcyclohexyl)propionic acid (mixture of 2-, 3- and 4-methyl and cis and trans isomers).

(c) 3-(methylcyclohexyl)propanol.—A solution of 60.0 g. of β-(methylcyclohexyl)propionic acid, obtained as described above in part (b), in 100 cc. of dry ether was added dropwise over a fifty minute period to a suspension of 20.2 g. of lithium aluminum hydride in 300 cc. of dry ether, while allowing the mixture to reflux gently. The reaction mixture was cooled, 50 cc. of water was added followed by 500 cc. of concentrated hydrochloric acid. The aqueous layer was separated, and the ether layer was washed with 10% sodium carbonate solution and dried over anhydrous calcium sulfate. The ether solution was concentrated and distilled giving 51.4 g. of 3-(methylcyclohexyl)propanol (mixture of 2-, 3- and 4-methyl and cis and trans isomers), B. P. 75–76.5° C. (0.4 mm.), $n_D^{25}=1.4649$.

(d) 3-(methylcyclohexyl)propyl bromide.—Hydrogen bromide gas was passed through 51.3 g. of 3-(methylcyclohexyl)propanol, obtained as described above in part (c), over a period of about two hours at a temperature of about 85–110° C. The reaction mixture was cooled, 150 cc. of petroleum ether (Skellysolve B) was added, the water layer which had formed was drawn off, and the petroleum ether solution was washed with three 25 cc. portions of concentrated sulfuric acid and then several times with sodium chloride solution, the last washing containing six drops of concentrated ammonium hydroxide. The petroleum ether solution was dried over anhydrous calcium sulfate, concentrated and distilled, collecting the material boiling at 62–66° C. (0.5 mm.). This material was redistilled, giving 58.5 g. of 3-(methylcyclohexyl)propyl bromide (mixture of 2-, 3- and 4-methyl and cis and trans isomers), B. P. 56.5–59.5° C. (0.21 mm.), $n_D^{25}=1.4832$.

Analysis.—Calcd. for $C_{10}H_{19}Br$: C, 54.80; H, 8.74; Br, 36.46. Found: C, 55.20; H, 8.66; Br, 36.23.

(e) Bis[3-(methylcyclohexyl)propyl]amine hydrochloride.—A mixture of 58.0 g. of 3-(methylcyclohexyl)propyl bromide, 16.8 g. of anhydrous sodium carbonate and 58.3 cc. of freshly prepared 1.515 molar solution of ammonia in absolute ethanol was heated in an autoclave with shaking for eight hours at 143–148° C. The reaction mixture was cooled, water was added and the mixture distilled to dryness on a steam bath. The distillate contained some oil, and therefore it was diluted to a volume of 1.75 liters with water and extracted three times with benzene. The benzene extracts were added to the distillation residue, and water followed by sufficient 10% sodium carbonate solution to make the solution strongly basic was added, and the mixture was shaken. The benzene layer was separated and extracted with dilute hydrochloric acid. It was found that very little material was extracted by the hydrochloric acid because the hydrochloride salt of the product is relatively insoluble in water while soluble in benzene. The benzene layer was dried over anhydrous calcium sulfate, concentrated and distilled. The hydrochloride salt of the product dissociated upon heating, the material boiling at 187–202° C. (0.25 mm.) being collected (24.1 g.). The semisolid distillate containing mixed hydrochloride and free base was stirred with 300 cc. of petroleum ether (Skellysolve A). Most of the material dissolved, and the remaining white solid was collected by filtration and further washed with about 100 cc. of petroleum ether. The solid material (3.25 g.) was collected by filtration, and had the M. P. 155–177° C. The latter was recrystallized from ether giving bis[3-methylcyclohexyl)propyl]amine hydrochloride (mixture of 2-, 3- and 4-methyl and cis and trans isomers), M. P. 150–152° C. (corr.).

Analysis.—Calcd. for $C_{20}H_{39}N \cdot HCl$: C, 72.79; H, 12.12; N, 4.25; Cl, 10.75. Found: C, 72.60; H, 11.90; N, 4.12; Cl, 10.75.

Bis[3-(methylcyclohexyl)propyl]amine hydrochloride has a coronary dilator activity of eight-ten times that of papaverine when measured on the isolated rabbit heart.

(f) Tris[3-(methylcyclohexyl)propyl]amine.—The petroleum ether filtrate obtained after filtration of the 3.25 g. of crude bis[3-(methylcyclohexyl)propyl]amine hydrochloride, M. P. 155–177° C., described above in part (e), was evaporated to a low volume and thoroughly cooled, the solid which separated was removed by filtration, petroleum ether and ether were added to the filtrate, and the filtrate was washed three times with 30 cc. portions of 10% potassium hydroxide solution, dried over anhydrous calcium sulfate, concentrated and distilled. The fraction boiling at 206–210° C. (0.15 mm.) was collected, giving 7.8 g. of tris[3-(methylcyclohexyl)propyl]amine (mixture of 2-, 3- and 4-methyl and cis and trans isomers), $n_D^{25}=1.4842-9$.

Analysis.—Calcd. for $C_{30}H_{57}N$: C, 83.45; H, 13.31; N, 3.24. Found: C, 83.56; H, 13.40; N, 3.27.

*Example 2*

Tris[3-(methylcyclohexyl)propyl]amine.—A mixture of 87 g. of 3-(methylcyclohexyl)propyl bromide, obtained as described above in Example 1, part (d), 25.2 g. of anhydrous sodium carbonate, 118 cc. of freshly standardized 1.345 molar ammonia in ethanol and 100 cc. of ethanol was heated in an autoclave with shaking for ten hours at 143–147° C. The reaction mixture was cooled and concentrated by distillation. The residue was dissolved in benzene, and the benzene solution was washed with 10% sodium carbonate solution and with water and dried over anhydrous calcium sulfate. The benzene solution was concentrated in vacuo, and the residue (54.5 g.) was stirred several times with 100–200 cc. portions of petroleum ether (Skellysolve B), and the clear solution decanted from the insoluble oil. The petroleum ether soluble fraction (45.2 g.) was distilled, and the fraction boiling at 200–203° C. (0.12 mm.) was collected, giving 18.67 g. of tris[3-(methylcyclohexyl)propyl]amine (mixture of 2-, 3- and 4-methyl and cis and trans isomers), $n_D^{25}=1.4849$.

Tris[3-(methylcyclohexyl)propyl]amine has a coronary dilator activity of five–ten times that of papaverine when measured on the isolated rabbit heart.

*Example 3*

*Ethyl-bis[3-(methylcyclohexyl)propyl]amine.*—A mixture of 65.7 g. of 3-(methylcyclohexyl)propyl bromide, obtained as described above in Example 1, part (*d*), 19.1 g. of anhydrous sodium carbonate, 5.4 g. of ethylamine and 80 cc. of dry ethanol was heated in an autoclave with shaking for eight hours at 142–147° C. The reaction mixture was worked up according to the method described above in Example 2, and the product distilled, the fraction boiling at 142.5–146° C. (0.09–0.10 mm.) being collected. There was thus obtained 24.5 g. of ethyl-bis[3-(methylcyclohexyl)propyl]amine (mixture of 2-, 3- and 4-methyl and cis and trans isomers), $n_D^{25}=1.4749$.

*Analysis.*—Calcd. for $C_{22}H_{43}N$: C, 82.15; H, 13.49; N, 4.36. Found: C, 82.15; H, 13.59; N, 4.34.

Ethyl - bis[3 -(methylcyclohexyl)propyl]amine has a coronary dilator activity of about forty times that of papaverine when measured on the isolated rabbit heart.

*Example 4*

(*a*) *3 -(3 - methylcyclohexyl)propyl bromide.*—When the same series of reactions described above in Example 1 was carried out, using pure 3-methylcinnamic acid (free of the 2- and 4-methyl isomers), M. P. 118–119° C., the following compounds were successively obtained: β-(3-methylcyclohexyl)propionic acid, B. P. 129–130° C. (2 mm.), $n_D^{25}=1.4608$; 3-(3-methylcyclohexyl)propanol, B. P. 105° C. (4 mm.), $n_D^{25}=1.4619$; and 3-(3-methylcyclohexyl)propyl bromide, B. P. 95° C. (4 mm.), $n_D^{25}=1.4820$.

(*b*) *Ethyl-bis[3-(3-methylcyclohexyl)propyl]amine* was prepared from 3-(3-methylcyclohexyl)propyl bromide and ethylamine according to the manipulative procedure described above in Example 3. There was thus obtained ethyl-bis[3-(3-methylcyclohexyl)propyl]amine (mixture of cis and trans isomers), B. P. 153° C. (0.3 mm.), $n_D^{25}=1.4734$.

*Example 5*

(*a*) β-(*4-methylcyclohexyl*)propionic acid was prepared from 121.5 g. of 4-methylcinnamic acid and 4.0 g. of platinum oxide catalyst according to the method described above in Example 1, part (*b*). There was thus obtained 121.2 g. of β-(4-methylcyclohexyl)-propionic acid (mixture of cis and trans isomers), B. P. 106–107° C. (0.65 mm.), $n_D^{25}=1.4620$.

(*b*) *3 -(4 - methylcyclohexyl)propanol* was prepared from 120.5 g. of β-(4-methylcyclohexyl)propionic acid and 40.5 g. of lithium aluminum hydride according to the manipulative procedure described above in Example 1, part (*c*). There was thus obtained 96.4 g. of 3-(4-methylcyclohexyl)propanol (mixture of cis and trans isomers), B. P. 75–76° C. (0.72–0.82 mm.), $n_D^{25}=1.4632$.

(*c*) *3-(4-methylcyclohexyl)propyl bromide* was prepared from 98 g. of 3-(4-methylcyclohexyl)propanol and hydrogen bromide according to the manipulative procedure described above in Example 1, part (*d*). There was thus obtained 128 g. of 3-(4-methylcyclohexyl)propyl bromide (mixture of cis and trans isomers), B. P. 80–81.5° C. (1.5 mm.), $n_D^{25}=1.4832$.

*Analysis.*—Calcd. for $C_{10}H_{19}Br$: C, 54.80; H, 8.74; Br, 36.46. Found: C, 54.74; H, 8.68; Br, 36.1.

(*d*) *Ethyl-bis[3-(4-methylcyclohexyl)propyl]amine.*—A mixture of 65.7 g. of 3-(4-methylcyclohexyl)propyl bromide, 19.1 g. of anhydrous sodium carbonate, 6.75 g. of ethylamine and 70 cc. of absolute ethanol was heated in an autoclave with shaking at 145° C. for eight hours. The reaction mixture was worked up according to the manipulative procedure described above in Example 2, and the prdouct was distilled. The fraction boiling at 136–139° C. (0.05–0.08 mm.) (26.5 g.) was collected and redistilled, giving ethyl-bis[3-(4-methylcyclohexyl)-propyl]amine (mixture of stereoisomers), B. P. 139° C. (0.07 mm.), $n_D^{25}=1.4752$.

*Analysis.*—Calcd. for $C_{22}H_{43}N$: C, 82.17; H, 13.43; N, 4.36. Found: C, 81.83; H, 13.54; N, 4.31.

If in the foregoing series of reactions, 4-methylcinnamic acid is replaced by 2-ethylcinnamic acid, 3-propylcinnamic acid or 4-butylcinnamic acid (prepared, respectively, by condensing 2-ethylbenzaldehyde, 3-propylbenzaldehyde or 4-butylbenzaldehyde with malonic acid according to the Knoevenagel reaction) there can be obtained, respectively, ethyl-bis[3-(2-ethylcyclohexyl)-propyl]amine, ethyl-bis[3 -(3-propylcyclohexyl)propyl]-amine or ethyl-bis[3-(4-butylcyclohexyl)propyl]amine.

If in part (*d*) above, ethylamine is replaced by butylamine, hexylamine, octylamine or isohexylamine, there can be obtained, respectively, butyl-bis[3-(4-methylcyclohexyl)propyl]amine, hexyl-bis[3 -(4-methylcyclohexyl)-propyl]amine, octyl-bis[3 -(4-methylcyclohexyl)propyl]-amine, or isohexyl-bis[3 -(4 - methylcyclohexyl)propyl]-amine.

*Example 6*

(*a*) *Benzyl-bis[3-(4-methylcyclohexyl)propyl]amine.*—A solution of 16.05 g. of benzylamine in 50 cc. of absolute ethanol was added over a one hour period to a mixture of 65.7 g. of 3-(4-methylcyclohexyl)propyl bromide, 21.2 g. of anhydrous sodium carbonate and 150 cc. of absolute ethanol. The mixture was refluxed for seven and one-half hours after the addition of amine was completed, and was allowed to stand overnight. The mixture was extracted with benzene and the benzene extracts were washed with 10% sodium carbonate solution and 10% sodium hydroxide solution and with water. The benzene solution was dried and concentrated, and the residue was stirred with petroleum ether (Skellysolve A) and the clear solution decanted and concentrated. The residue was distilled and the fraction boiling at 177–180° C. (0.05 mm.) (34.46 g.) was collected and redistilled, giving benzyl-bis [3-(4-methylcyclohexyl)-propyl]amine (mixture of cis and trans isomers), B. P. 180–181° C. (0.09 mm.), $n_D^{25}=1.5059$.

*Analysis.*—Calcd. for $C_{27}H_{45}N$: C, 84.52; H, 11.82; N, 3.65. Found: C, 84.53; H, 11.77; N, 3.64.

(*b*) *Bis[3-(4-methylcyclohexyl)propyl]amine.*—A mixture of 15.6 g. of benzyl-bis[3-(4-methylcyclohexyl)propyl]amine, 275 cc. of 95% ethanol and one teaspoonful of buffered palladium-on-charcoal catalyst was shaken in an atmosphere of hydrogen at a temperature of 42–51° C. until absorption of hydrogen had ceased. The catalyst was removed by filtration and the filtrate was concentrated and distilled, giving about 9 g. of bis[3-(4-methylcyclohexyl)propyl]amine (mixture of cis and trans isomers), B. P. 138–140° C. (0.09 mm.) $n_D^{25}=1.4786$.

*Analysis.*—Calcd. for $C_{20}H_{39}N$: C, 81.83; H,13.39; N, 4.77. Found: C, 82.23; H, 13.08; N, 4.76.

A sample of bis[3-(4-methylcyclohexyl)propyl]amine when treated with dilute hydrochloric acid and the resulting solid collected, dried and recrystallized from acetone gave the hydrochloride salt, M. P. 186.5–188° C.

Bis[3-(4-methylcyclohexyl)propyl]amine has a coronary dilator activity of ten–twenty times that of papaverine when measured on the isolated rabbit heart.

(*c*) *Methyl-bis[3-(4-methylcyclohexyl)propyl]amine* can be prepared by alkylation of bis[3-(4-methylcyclohexyl)propyl]amine with methyl bromide.

*Example 7*

(*a*) *Benzyl - bis[3 - (3 - methylcyclohexyl)propyl]-amine* was prepared from 3-(3-methylcyclohexyl)propyl bromide and benzylamine according to the manipulative procedure given above in Example 6, part (*a*). The product was obtained as a mixture of cis and trans isomers, B. P. 160–162° C. (0.02 mm.), $n_D^{25}=1.5046$.

*Analysis.*—Calcd. for $C_{27}H_{45}N$: C, 84.52; H, 11.82; N, 3.65. Found: C, 84.65; H, 11.45; N, 3.64.

(b) *Bis[3-(3-methylcyclohexyl)propyl]amine* was prepared by hydrogenolysis of benzyl-bis[3-(3-methylcyclohexyl)propyl]amine according to the manipulative procedure given above in Example 6, part (b). The compound was obtained as a mixture of cis and trans isomers, B. P. 126–127° C. (0.03 mm.), $n_D^{25}=1.4764$.

*Analysis.*—Calcd. for $C_{20}H_{39}N$: C, 81.84; H, 13.39; N, 4.77. Found: C, 81.96; H, 13.23; N, 4.78.

I claim:

1. Bis[3-(lower-alkylcyclohexyl)propyl]amine.
2. Tris[3-(lower-alkylcyclohexyl)propyl]amine.
3. Bis[3-(lower-alkylcyclohexyl)propyl]-lower-alkylamine.
4. A compound selected from the class consisting of an amine having the formula

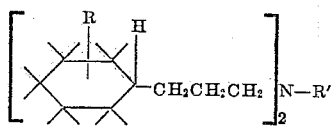

wherein R is a lower-alkyl group, and R' is a member of the class consisting of hydrogen and lower-alkyl and 3-(lower-alkylcyclohexyl)propyl radicals; and acid-addition salts thereof.

5. Tris[3-(3-methylcyclohexyl)propyl]amine.
6. Bis[3-(3-methylcyclohexyl)propyl]amine.
7. Ethyl-bis[3-(3-methylcyclohexyl)propyl]amine.
8. Bis[3-(4-methylcyclohexyl)propyl]amine.
9. Ethyl-bis[3-(4-methylcyclohexyl)propyl]amine.
10. The process for preparing a poly[3-(lower-alkylcyclohexyl)propyl]amine which comprises heating a 3-(lower-alkylcyclohexyl)propyl halide with a member of the group consisting of ammonia and a primary lower-alkylamine in the presence of an acid acceptor.
11. The process for preparing a bis[3-(lower-alkylcyclohexyl)propyl]-lower-alkylamine which comprises heating a 3-(lower-alkylcyclohexyl)propyl halide with a primary lower-alkylamine in the presence of an acid acceptor.
12. The process for preparing ethyl-bis[3-(3-methylcyclohexyl)propyl]amine which comprises heating a 3-(3-methylcyclohexyl)propyl halide with ethylamine in the presence of sodium carbonate.
13. The process for preparing ethyl-bis[3-(4-methylcyclohexyl)propyl]amine which comprises heating a 3-(4-methylcyclohexyl)propyl halide with ethylamine in the presence of sodium carbonate.

References Cited in the file of this patent

UNITED STATES PATENTS

| | | |
|---|---|---|
| 2,180,344 | Blicke | Nov. 21, 1939 |
| 2,225,619 | Britton et al. | Dec. 24, 1940 |
| 2,226,160 | Dietrich | Dec. 24, 1940 |
| 2,278,123 | Heyn | Mar. 31, 1942 |